F. A. BLAKE.
CENTRIFUGAL EXTRACTOR.
APPLICATION FILED JUNE 4, 1919.
1,402,206.
Patented Jan. 3, 1922.
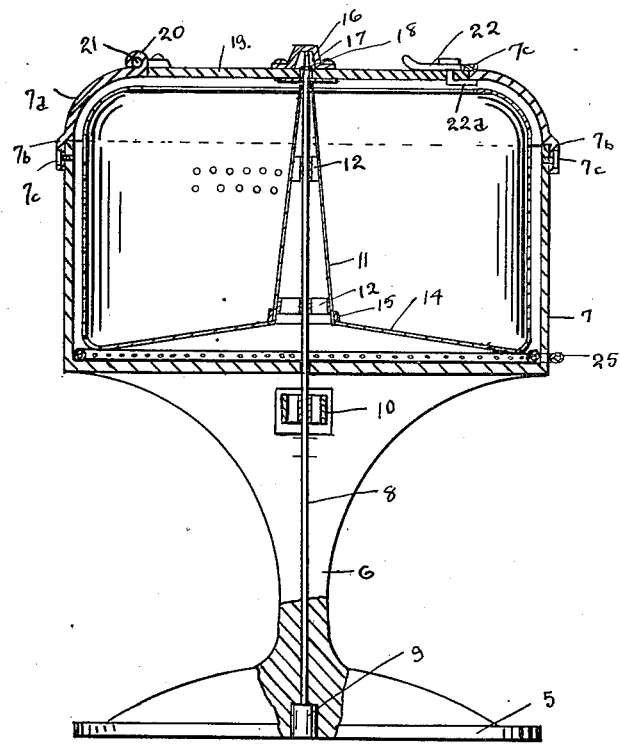
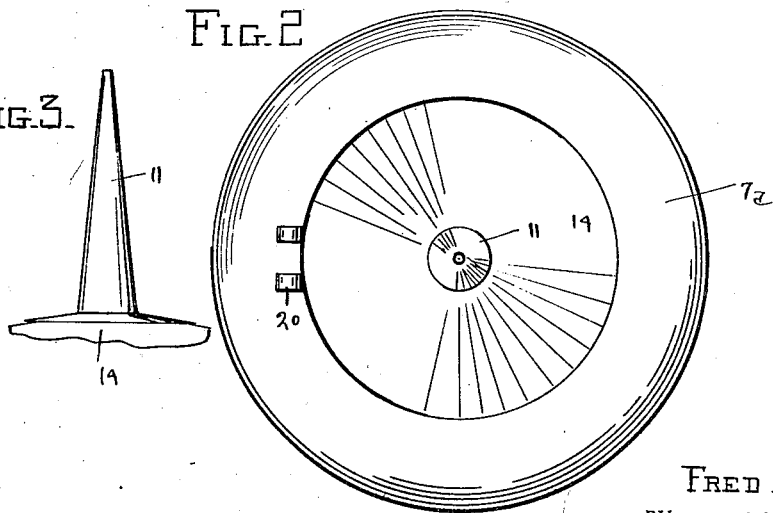
INVENTOR.
FRED A. BLAKE
BY Joseph J. O'Brien
ATTORNEY.

UNITED STATES PATENT OFFICE.

FRED A. BLAKE, OF SPRINGFIELD, MASSACHUSETTS.

CENTRIFUGAL EXTRACTOR.

1,402,206.  Specification of Letters Patent.  Patented Jan. 3, 1922.

Application filed June 4, 1919. Serial No. 301,815.

*To all whom it may concern:*

Be it known that I, FRED A. BLAKE, a citizen of the United States of America, and resident of Springfield, in the county of Hampden and State of Massachusetts, have invented certain new and useful Improvements in Centrifugal Extractors, of which the following is a full, clear, and exact description.

This invention relates to improvements in centrifugal dryers for laundries, textile mills and the like and its leading object is to provide a machine of this type with means whereby the clothes may be evenly distributed in the roller and tearing will be prevented.

With the above and other objects in view this invention relates to certain new and useful constructions, combinations and arrangements of parts, clearly described in the following specification and fully illustrated in the accompanying drawings, in which:

Fig. 1 is a vertical sectional view through a machine embodying my invention.

Fig. 2 is a top plan view with the cover removed.

Fig. 3 is a detail elevation of the can.

Referring to the accompanying drawings 5 designates the base on which the standard 6 is mounted, and on this standard the bowl 7 is positioned. In the bowl 7 a rotor or centrifugal drying element 14 is arranged to rotate with the shaft 8, the lower end of which is journaled in the bearing 9 and which is equipped with a pulley 10 and the upper end of which extends to a point above the rotor 14.

The shaft 8 is also equipped with spiders 12 which support a cone 11 and the base of this cone is connected by a tight joint with the flange 15 of the base of the rotor, which base is slightly dished to insure an efficient drainage of the water. The upright wall of the rotor is perforated as in the usual practice and the upper edge portion of said wall is inturned to provide an overhanging loop or the like as in the usual practice. A drain pipe 25 is positioned on the bottom of the bowl 7 to remove the extra water. On the upright wall of the bowl 7 a cover section $7^a$ is hinged to seat, said cover section being provided with a concentric shoulder $7^b$ adapted to seat on the upper edge of said upright wall and this section $7^a$ may be detachably connected with the upright wall by means of screws $7^c$. The cover section $7^a$ is preferably formed with a curvature parallel to that of the overhanging loop of the extractor rotor 14 and is provided with a relatively large central opening which is closed by means of the cover section 19. The cover section 19 is connected with the hinge eyes 20 of the cover section $7^a$ by means of a pintle 21 and said cover section 19 is provided with a stop $7^d$ to limit its downward movement as shown in Fig. 1. The cover section 19 is held in closed position by means of a latch which comprises an operating lever 22 and an L-shaped latching finger $22^a$ which is adapted to be swung under the horizontal portion of the cover section $7^a$.

The central portion of the section 19 is provided with an opening through which the upper end of the shaft 8 extends and this shaft end is formed slightly conical and is received by a roller bearing 16 contained in a cone 17 secured by the bolts 18 to the cover section 19, so that the rotor will rotate without wobbling in the bowl 7 and the life of the machine prolonged. By opening the latch 22 the section 19 may be swung on the hinge eyes 20 and the contents of the rotor may be removed. The position of the cone prevents the operator loading the basket in such manner that a garment can be disposed across the center of the basket on opposite sides thereof or looped around the axis of the basket, with the result that the operator is compelled to properly load the basket and tearing is prevented when the basket is rapidly rotated. By means of the bearing provided on the cover the operator is compelled to keep the cover closed and as result the life of the machine is thus greatly prolonged and its action rendered more efficient.

Having described my invention I claim:

1. A centrifugal laundry extractor for extracting water from garments and fabrics consisting of a casing providing a bowl, a basket therein, a shaft extending through the casing and a cone mounted on the shaft and providing a support for the basket on said shaft, the basket being engaged by the base of the cone.

2. A centrifugal extractor for drying fabrics and the like consisting of a casing having a bowl, a shaft extending through the casing, a cone mounted on said shaft with its base lowermost, a basket disposed against the base of the cone, the upper end of the shaft projecting above the cone and a cover for the casing having a bearing for said shaft.

3. A centrifugal extractor consisting of a casing having a bowl, a shaft mounted on the casing and extending into the bowl, a cone on the shaft with its base lowermost to rotate in the casing bowl, a basket having its lowermost end upturned and connected to the base of the cone, the upper end of said shaft projecting above the cone, and a cover hinged to the casing and adapted to be locked thereon and provided with a bearing for the upper end of the shaft.

4. The combination with a centrifugal laundry extractor including a stationary bowl and a rotary basket therein, of a shaft having a portion extending into the stationary bowl and an extension projecting vertically through the basket, the basket being mounted on the shaft for rotative movement therewith, and a cone mounted on the shaft extension and having engagement at its base with the basket, the larger end of the cone engaging the basket and the smaller end of the cone being disposed near the plane of the top of the basket, the cone providing means for preventing clothes and garments winding about the axis of the rotating basket.

Signed by me at Springfield, Mass.

FRED A. BLAKE.